United States Patent [19]
Olson

[11] Patent Number: 5,590,852
[45] Date of Patent: Jan. 7, 1997

[54] APPARATUS FOR CONTROLLING THE PARTIAL PRESSURE OF OXYGEN IN AN AIRCRAFT CABIN

[75] Inventor: Robert W. Olson, Tucson, Ariz.

[73] Assignee: AlliedSignal Inc., Morris Township, N.J.

[21] Appl. No.: 483,642

[22] Filed: Jun. 7, 1995

Related U.S. Application Data

[63] Continuation of Ser. No. 114,792, Aug. 31, 1993, abandoned.

[51] Int. Cl.$^6$ .................................................. B64D 13/00
[52] U.S. Cl. ................................ 244/118.5; 128/204.18; 454/74
[58] Field of Search ......................... 244/118.5, 129.1, 244/121; 128/205.23, 204.21, 204.18, 202.61, 205.24, 204.26; 454/75, 76; 137/487.5, 88, 81

[56] References Cited

U.S. PATENT DOCUMENTS

| | | |
|---|---|---|
| 3,526,239 | 9/1970 | Oroza . |
| 4,057,205 | 11/1977 | Vensel .................................. 244/118.5 |
| 4,109,509 | 8/1978 | Cramer . |
| 4,148,311 | 4/1979 | London . |
| 4,261,416 | 4/1981 | Hamamoto ........................... 244/118.5 |
| 4,282,870 | 8/1981 | Porlier .................................. 244/118.5 |
| 4,335,735 | 6/1982 | Cramer . |
| 4,499,914 | 2/1985 | Schebler . |
| 4,651,728 | 3/1987 | Gupta . |
| 4,919,124 | 4/1990 | Stevenson et al. ................. 128/202.26 |
| 5,071,453 | 12/1991 | Hradek et al. ........................ 244/118.5 |
| 5,199,423 | 4/1993 | Harral . |
| 5,269,295 | 12/1993 | Foote et al. .......................... 244/118.5 |
| 5,273,486 | 12/1993 | Emmons et al. ..................... 244/118.5 |

*Primary Examiner*—Galen L. Barefoot
*Attorney, Agent, or Firm*—James W. McFarland

[57] ABSTRACT

An aircraft cabin pressure control system controls aircraft cabin pressure by reference to either the partial pressure or concentration of oxygen in the aircraft cabin. Data on ambient pressure, oxygen content, and total pressure are employed to control air pressure in the cabin.

5 Claims, 2 Drawing Sheets

APPARATUS FOR CONTROLLING THE PARTIAL PRESSURE OF OXYGEN IN AN AIRCRAFT CABIN

This application is a continuation of application Ser. No. 08/114,792 filed Aug. 31, 1993, now abandoned.

BACKGROUND OF THE INVENTION

This invention relates in general to pressure controls and in particular to a pressure control system for aircraft cabins.

An important aspect of the quality of air in an aircraft cabin is the concentration of oxygen available for the passengers and flight crew. When oxygen concentration in human tissue is deficient, hypoxia occurs. The physiological response of hypoxia varies with the subject, but its effects typically include drowsiness, lassitude, mental fatigue, headache, occasional nausea and euphoria. More serious symptoms include diminished mental proficiency, diminished consciousness, and poor night vision.

Studies have shown that the onset of hypoxia symptoms can occur at various altitudes, becoming noticeably aggravated at altitudes above 8000 feet of pure air. In a typical pressure control system for an aircraft cabin, cabin pressure is measured and controlled to a minimum level of 75,263 Pa, which is the average pressure of pure standard air at an altitude of 8000 feet. However, air within an aircraft cabin is not pure air. The air contains contaminants and moisture. As moisture and contaminants are added to the air, oxygen molecules are displaced. Consequently, for a given total barometric pressure, the partial pressure of oxygen is reduced. Accordingly, the partial pressure of oxygen may be substantially below what is nominally expected at an altitude of 8000 feet. Because existing cabin pressure control systems control total pressure in the aircraft cabin without regard to the partial pressure of oxygen, hypoxia can occur at altitudes below 8000 feet.

An objective of this invention is to provide a cabin pressure control system which controls pressure by reference to the partial pressure of oxygen. Other advantages provided by the invention may become clear in light of the following description, which includes the appended claims and accompanying drawing.

SUMMARY OF THE INVENTION

An aircraft cabin pressure control system according to this invention controls aircraft cabin pressure by reference to either the partial pressure or concentration of oxygen in the cabin air. By sensing and controlling the partial pressure or concentration of oxygen, the cabin pressure control system provides a safer and more comfortable cabin environment.

DETAILED DESCRIPTION OF THE INVENTION

Figure 1:
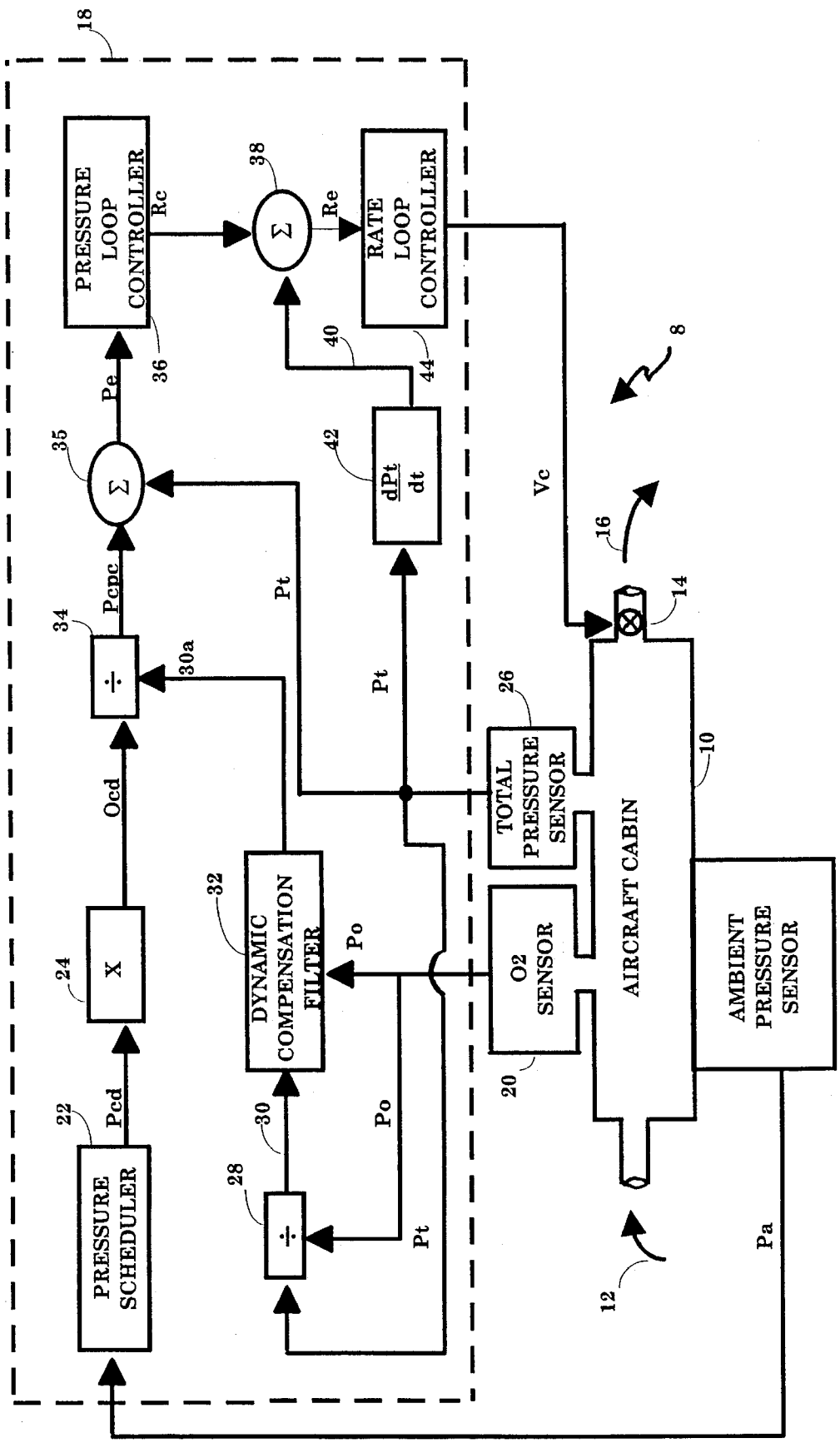
FIG. 1 is a schematic diagram of a cabin pressure control system incorporating the invention.

In FIG. 1, boxes represent sensors or processes occurring in a microprocessor, as indicated, and arrows represent electrical signals or airflow, as indicated.

FIG. 1 illustrates a control system 8 for an aircraft cabin 10 which is pressurized with an inflow 12 of air. The air is typically supplied by engine compressors and conditioned by an environmental control system. At least one valve 14 regulates the flow 16 of air out of the cabin 10 to control the cabin pressure. A Cabin Pressure Controller (CPC) 18 in the form of a microprocessor outputs valve command signals Vc which are communicated through and appropriate interface (not shown) and which command the outflow valve 14 to modulate between opened and closed positions such that pressure in the cabin 10 is controlled to a scheduled cabin pressure. The valve commands Vc are generated by reference to either the concentration or partial pressure of oxygen in the cabin 10, as provided by an oxygen sensor 20.

The CPC 18 includes a conventional pressure scheduler 22 which outputs a pressure command Pcd signal indicative of the desired total pressure of air the cabin 10. Many well known pressure schedulers generate a cabin pressure command as a linear function of ambient pressure Pa. An exemplary scheduler is described U.S. Pat. No. 4,164,897 Aldrich, the disclosure of which is incorporated herein by reference thereto. The scheduler 16 can generate the pressure command Pcd signal via a lookup table, or it can execute an appropriate algorithm which calculates desired pressure as a function of ambient pressure.

According to the prior art, cabin pressure would be maintained as indicated by the desired pressure command signal Pcd. According to the invention, however, cabin pressure is maintained in accord with a command signal Ocd indicating the desired partial pressure or concentration of oxygen. The oxygen command signal Ocd is generated under the assumption that the volume of the cabin 10 and the temperature of the gases within the cabin are relatively constant. With volume and temperature being relatively constant, the ratio between oxygen and the other components of the cabin air is also relatively constant, even for variations in total barometric pressure. For dry, pure air, oxygen content is assumed to be 20.95% of total barometric pressure. The oxygen command signal Ocd is generated via a multiplier 24 which multiplies the pressure command signal Pcd by a constant having a nominal value of 0.2095 (the ratio of oxygen to other gases in the air). The CPC 18 maintains oxygen content in the cabin 10 at the level indicated by the oxygen command signal Ocd as follows.

A total pressure sensor 26, in fluid communication with the cabin 10, generates a signal Pt proportional to the total pressure of air within the cabin 10. The oxygen sensor 20, also in fluid communication with the cabin 10, generates a signal Po that is proportional to either the concentration or partial pressure of oxygen in the cabin 10. If the oxygen sensor employed outputs signals proportional to the partial pressure of oxygen, then a divider 28 divides the oxygen signal Po by the total pressure signal Pt to output a signal 30 indicating the sensed percentage of oxygen in the cabin 10. If the oxygen sensor employed outputs signals proportional to oxygen concentration, then use of the divider 28 is unnecessary, and the signal Po is then equivalent to the signal 30.

The signal 30 is adjusted by a dynamic compensation filter 32 which compensates for factors such as transient response and steady state error. The output of the filter 32 is an adjusted signal 30a. The signals 30a and Ocd are communicated to a divider 34 which takes the ratio of the signal 30a over the oxygen command signal Ocd to output a cabin pressure command signal Pcpc. The total pressure in the cabin 10 is maintained in accord with the cabin pressure command signal Pcpc through conventional control practice.

Generated at a summing junction 35 is a pressure error signal Pe indicating the difference between the cabin pressure command signal Pcpc and the total cabin pressure signal Pt. A pressure loop controller 36 converts the pressure error signal Pe into a rate command Rc by multiplying the pressure error signal by a suitable gain and transfer function. Generated at a second summing junction 38 is a rate error signal Re indicating the difference between commanded rate and the actual change in pressure rate. The latter is provided at the output 40 of a differentiator 42 which determines the change in total cabin pressure over time. A rate loop controller 44 converts the rate error signal Re into the valve command Vc.

The CPC 18 can be implemented as either an analog controller or a digital controller. As mentioned above, a microprocessor-based controller is preferred.

Thus disclosed is a cabin pressure control system 8 that, by measuring and controlling the content of oxygen, provides a safer and more comfortable environment in an aircraft cabin. Being sensitive to the level of contaminants in the cabin 10, the system 8 allows for greater recirculation of cabin air, thereby reducing the need for bleed air from the aircraft's engines. The reduction in bleed air in turn reduces the load on the engines.

Figure 2:
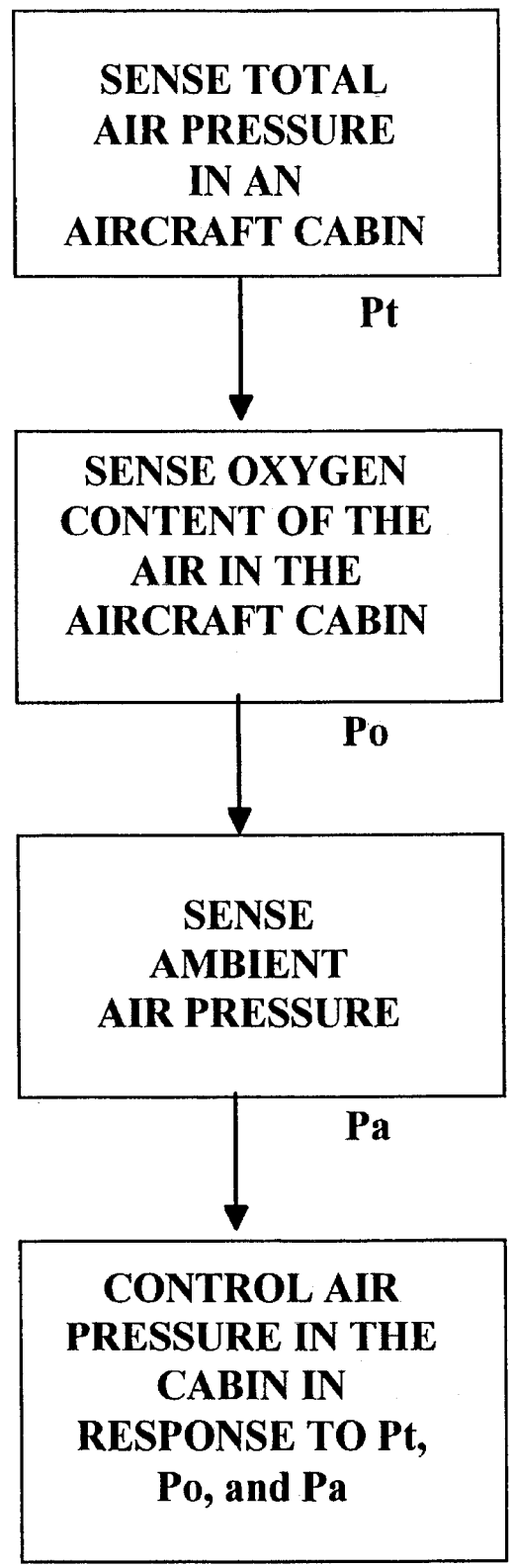
FIG. 2 is a block diagram illustrating the method of controlling aircraft cabin pressure in accord with the invention.

As illustrated in FIG. 2, the invention in general provides a method for controlling the pressure of air in an aircraft cabin. The salient steps in the method include: 1) data acquisition for ambient pressure, oxygen content, and total cabin pressure, and 2) data processing and control in response to the acquired data.

It will be understood that embodiments described herein are merely exemplary and that a person skilled in the art may make many modifications and variations without departing from the spirit of the present invention. All such modifications are intended to be included within the scope of this invention as defined by the appended claims.

I claim:

1. Apparatus for controlling the pressure of air in a pressurized aircraft cabin, said apparatus operable to maintain a preselected level of oxygen content in said air in the pressurized aircraft cabin without use of a separate source of concentrated oxygen for the cabin, comprising in combination:

first sensing means for acquiring data to produce a first output signal indicative of oxygen content in said air;

second sensing means for acquiring data to produce a second output signal indicative of total air pressure in said cabin;

electrical means for processing said output signals to produce a command signal; and valve means responsive to said command signal for regulating outflow of said air from said cabin to adjust cabin pressure to maintain said preselected level of oxygen content in said air, and to maintain a minimum level of said total air pressure.

2. Apparatus as recited in claim 1 wherein the first sensing means is adapted to produce output signals indicative of oxygen concentration in said air.

3. Apparatus as recited in claim 1 wherein the first sensing means is adapted to produce output signals indicative of partial pressure of oxygen in said air.

4. Apparatus as recited in claim 1 wherein said electrical means comprises a microprocessor.

5. A method for controlling the pressure of air in a pressurized aircraft cabin to maintain a preselected level of oxygen content in said air in the pressurized aircraft cabin without use of a separate source of concentrated oxygen for the cabin, comprising the steps of:

sensing total air pressure in said cabin to produce a first signal;

sensing oxygen content of said air to produce a second signal;

sensing ambient air pressure in an environment external to said cabin to produce a third signal; and controlling the pressure of said air in response to said first, second, and third signals to adjust cabin pressure to maintain said preselected level of oxygen content, in said air, and to maintain a minimum level of said total air pressure.

* * * * *